United States Patent
Tang et al.

(10) Patent No.: US 9,126,830 B2
(45) Date of Patent: Sep. 8, 2015

(54) METAL DOPED ZEOLITE MEMBRANE FOR GAS SEPARATION

(71) Applicant: BETTERGY CORP., Peekskill, NY (US)

(72) Inventors: Zhong Tang, Croton-on-Hudson, NY (US); Lin-Feng Li, Croton-on-Hudson, NY (US); Hongmin Jiang, Croton-on-Hudson, NY (US)

(73) Assignee: BETTERGY CORP., Peekskill, NY (US)

( * ) Notice: Subject to any disclaimer, the term of this patent is extended or adjusted under 35 U.S.C. 154(b) by 0 days.

(21) Appl. No.: 14/452,658

(22) Filed: Aug. 6, 2014

(65) Prior Publication Data
US 2015/0044130 A1 Feb. 12, 2015

Related U.S. Application Data

(60) Provisional application No. 61/862,654, filed on Aug. 6, 2013, provisional application No. 61/990,214, filed on May 8, 2014.

(51) Int. Cl.
*C01B 3/22* (2006.01)
*C01B 3/00* (2006.01)
(Continued)

(52) U.S. Cl.
CPC .............. *C01B 3/0078* (2013.01); *B01D 63/00* (2013.01); *C01B 3/503* (2013.01);
(Continued)

(58) Field of Classification Search
CPC .......................... C01B 2203/023; C01B 3/323
See application file for complete search history.

(56) References Cited

U.S. PATENT DOCUMENTS 5,070,052 A * 12/1991 Brownscombe et al. ....... 502/60
5,763,347 A * 6/1998 Lai .................................... 502/4
(Continued)

FOREIGN PATENT DOCUMENTS

WO         2010097108 A1    9/2010
WO    WO 2010097108 A1 *   9/2010

OTHER PUBLICATIONS

Pan et al. "Template-free secondary growth synthesis of MFI type zeolite membranes" 2001, Microporous and mesoporous materials, 43, 319-327.*

(Continued)

*Primary Examiner* — Stanley Silverman
*Assistant Examiner* — Syed Iqbal
(74) *Attorney, Agent, or Firm* — Karl F. Milde, Jr.; William H. Dippert; Eckert Seamans Cherin & Mellott, LLC

(57) ABSTRACT

The present invention discloses composite inorganic membranes, methods for making the same, and methods of separating gases, vapors, and liquids using the same. The composite zeolite membrane is prepared by TS-1 zeolite membrane synthesis, and subsequent palladium doping. In the composite zeolite membrane synthesis, two different methods can be employed, including in-situ crystallization of one or more layers of zeolite crystals an a porous membrane substrate, and a second growth method by in-situ crystallization of a continuous second layer of zeolite crystals on a seed layer of MFI zeolite crystals supported on a porous membrane substrate. The membranes in the form of disks, tubes, or hollow fibers have high gas selectivity over other small gases, very good impurity resistance, and excellent thermal and chemical stability over polymer membranes and other inorganic membranes for gas, vapor, and liquid, separations.

26 Claims, 4 Drawing Sheets

(51) Int. Cl.
*B01D 63/00* (2006.01)
*C01B 3/50* (2006.01)

(52) U.S. Cl.
CPC .. *C01B 2203/025* (2013.01); *C01B 2203/0233* (2013.01); *C01B 2203/0283* (2013.01); *C01B 2203/041* (2013.01); *C01B 2203/0435* (2013.01)

(56) References Cited

U.S. PATENT DOCUMENTS

| | | |
|---|---|---|
| 5,779,904 A | 7/1998 | Ruderman et al. |
| 6,051,517 A | 4/2000 | Funke et al. |
| 6,440,885 B1 | 8/2002 | Pierotti et al. |
| 6,794,069 B1 | 9/2004 | Faris et al. |
| 6,854,602 B2 | 2/2005 | Oyama et al. |
| 7,049,259 B1 | 5/2006 | Deckman et al. |
| 7,476,635 B2 | 1/2009 | Chau et al. |
| 7,491,262 B2 | 2/2009 | Kang et al. |
| 7,727,596 B2 | 6/2010 | Ma et al. |
| 7,744,675 B2 | 6/2010 | Saukaitis et al. |
| 7,749,414 B2 | 7/2010 | Bitterlich et al. |
| 8,153,099 B2 | 4/2012 | Yoon et al. |
| 8,221,718 B2 | 7/2012 | Ackley et al. |
| 8,303,692 B2 | 11/2012 | Kang et al. |
| 8,540,800 B2 | 9/2013 | Liu et al. |
| 8,647,997 B2 | 2/2014 | McEvoy et al. |
| 8,661,830 B2 | 3/2014 | Ku et al. |
| 8,685,143 B2 | 4/2014 | Carreon et al. |
| 2004/0173094 A1 | 9/2004 | Nakayama et al. |
| 2007/0130832 A1* | 6/2007 | Liu et al. ............... 48/198.7 |
| 2007/0157811 A1 | 7/2007 | Park et al. |
| 2009/0152763 A1 | 6/2009 | Liu et al. |
| 2009/0274616 A1 | 11/2009 | Miyake et al. |
| 2011/0015057 A1 | 1/2011 | Li et al. |
| 2012/0060687 A1 | 3/2012 | Murray et al. |
| 2012/0067207 A1 | 3/2012 | Williams et al. |
| 2012/0291484 A1 | 11/2012 | Terrien et al. |
| 2012/0291485 A1 | 11/2012 | Terrien et al. |
| 2012/0292574 A1 | 11/2012 | Terrien et al. |
| 2013/0022510 A1 | 1/2013 | Keshavan et al. |
| 2013/0330592 A1 | 12/2013 | Mizuno et al. |

OTHER PUBLICATIONS

Lai et al. "Microstructural optimization of a zeolite membrane for organic vapor separation", 2003, Science, vol. 300, p. 456-460.*
Elsevier Science B.V., "Template-Free Secondary Grwoth Synthesis of MFI Type Zeolite Membrances", M. Pan et al., Microporous and Mesoporous Materials 43 (2001) 319-327.
Vol. 300 Science, Apr. 18, 2003, "Microstructural Optimization of a Zeolite Membrane for Organic Vapor Separation", Lai et al., pp. 456-460.
International Search Report, Corresponding PCT Application No. PCT/US14/49864, Oct. 10, 2014.

* cited by examiner

METAL DOPED ZEOLITE MEMBRANE FOR GAS SEPARATION

CROSS-REFERENCE TO RELATED APPLICATION

This application is based upon and claims the benefit of the priorities of the filing dates of U.S. Provisional Patent Application Ser. No. 61/862,654, filed Aug. 6, 2013, and U.S. Provisional Patent Application Ser. No. 61/990,214, filed May 8, 2014, each of which is incorporated herein in its entirety.

STATEMENT REGARDING FEDERALLY SPONSORED RESEARCH OR DEVELOPMENT

The work described here was supported by The Small Business Innovation and Research Program (DOE Grant No. DE-SC0006179 and NSF Grant No. HP-1247577). The Federal Government may have certain rights in this invention.

FIELD OF THE INVENTION

The present invention is directed to a zeolite membrane, methods for making the zeolite membrane, and methods of separating gases, vapors, and liquids using the zeolite membrane. The zeolite membrane comprises a composite material comprising (1) modified silicalite zeolite with uniform crystal structure as activated diffusion channels, size-modified with treated metal cluster occupied in zeolitic pores as the gas conducting media, and (2) porous inorganic substrates as the membrane supports. Such a zeolite membrane is particularly suitable for use in a membrane reactor system for reactions involving high temperatures and high pressures.

BACKGROUND OF THE INVENTION

1. Zeolite and Zeolite Membrane

Zeolites are crystalline microporous aluminosilicates known as "molecular sieves." The uniform pore structure of a zeolite makes it an ideal material for separation by selective adsorption or molecular sieving. Zeolite membranes are polycrystalline thin films that either stand alone or are supported on strong rigid porous substrates of small mass transport resistance, such as macroporous and mesoporous ceramic, stainless steel, and glass plates, tubes, or hollow fibers. Zeolite membranes are commonly synthesized by hydrothermal treatment of the substrate surfaces in liquid phase aluminosilicate precursors (Si/Al=0~∞). The precursors can be in the form of a clear solution, sol, or gel depending on the chemical compositions. The crystallization of zeolites and the resultant crystal structure are sensitive to the precursor composition, the use of structure directing agents (SDA), the specific route of precursor preparation, and the synthesis temperature and duration.

Because a zeolite membrane is usually in the form of polycrystalline thin film on a porous substrate, the final zeolite membrane comprises inter-grown crystals with minimized intercrystalline spaces. The intercrystalline spaces are considered to be micro-defects because their sizes are larger than the sizes of zeolitic pores, causing significant decrease in selectivity, especially for separations relying upon the molecular sieving effect.

The chemical and structural stability of a zeolite membrane in high temperature atmospheres containing water vapor, acidic compounds, and other corrosive impurities is one of the very important properties of zeolite membranes. Generally, the thermal stability of zeolite structure increases with increasing Si/Al ratio in the framework. The all-silica MFI zeolite (silicalite) is thus far the most stable zeolite with thermal stability up to 1000° C. in gases containing sulfuric acidic vapors. Zeolites with low Si/Al ratios in the framework are generally not suitable in high temperature moist atmosphere applications because of their long term instability.

2. Membrane Substrates

Zeolite membranes are normally grown on a variety of supports, such as alumina and stainless steel, depending on their applications. The supports can be in the form of disks, tubular shapes, or hollow fibers, providing mechanical strength for zeolite membranes. The thickness of zeolite layers on supports is always a compromise between separation performance and the overall flux, which are two major criteria for determination of the quality of the zeolite membrane quality.

The support used for depositing zeolite membranes can be an available material such as amorphous silica, silicon wafers, glass or glass pre-coated with active silica, steel-wool sintered steel composites, porous ceramics (mullite, zirconia, $LiTaO_3$), porous $\alpha$- or $\gamma$-alumina, or composites thereof. Among these, the porous alumina or stainless steel supports are preferred. The supports themselves can be asymmetric to achieve good strength and low flow resistance. When the substrate is selected, the geometry of the support is important when considering the membrane module. A disc is easier to use than a tube for preparation of zeolite membranes, but a tube has a higher surface area to volume ratio. Zeolite membranes have also been made on ceramic hollow fibers and on $Al_2O_3$-coated SiC multi-channel monolith supports.

3. Zeolite Membrane Synthesis

A variety of techniques have been developed for fabrication of good quality zeolite membranes. Sol-gel and chemical vapor infiltration techniques have been used for preparation of zeolite-embedded inorganic matrices. Several zeolite membranes, such as MFI, NaA, FAU, $AlPO_4$, SAPO-34, MOR, and DDR, have been prepared by in-situ crystallization and/or seeded secondary growth methods.

In-situ hydrothermal crystallization is one of the most common methods used to prepare supported zeolite membranes. It usually consists of placing a suitable support in contact with a precursor solution or gel in an autoclave. A zeolite film is then grown on the support under hydrothermal conditions. The in-situ crystallization method has the advantage of simplicity of synthesis process that does not include an extra step for coating the seed layer as needed in the secondary growth approach. Multiple hydrothermal synthesis procedures may be needed to minimize micro-defects in the polycrystalline structure. Moreover, when zeolite membranes are grown directly by in-situ crystallization, the membrane quality is affected by the substrate properties. Substrate materials that lack active nucleation sites may result in poor coverage of membrane layer. Substrate surface defects, such as roughness or pinholes, may propagate through the membrane thickness, which lowers the separation selectivity.

The seeded secondary growth method is also commonly employed in the field due to several unique advantages over the in-situ synthesis route. First, by applying a seed layer, the influence of the base substrate can be eliminated to allow much better reproducibility and control of the final membrane quality. Second, because of the ability of the seed crystals to define the crystal structure of the subsequently grown zeolite film, some zeolite membranes can be obtained from template free precursors. The template-free synthesis not only reduces the consumption of expensive template agents but also avoids the template removal step, which may enlarge the undesirable nanometer scale intercrystalline boundaries.

One of the critical steps during the secondary growth synthesis is the preparation of seeds with uniform nano-scale dimension. Seeding can be done by several methods. These include rubbing the support surface with zeolite crystals, pulsed laser ablation of zeolite powder, and coating with colloidal zeolite particles. Each of these approaches presents distinct advantages and disadvantages. Seeding by rubbing is simple and applicable whenever a zeolite powder is available. However, it cannot be used for seeding internal surfaces of tubes and may be difficult to reproduce and to scale up or automate. Seeding by laser ablation requires expensive instrumentation and is difficult to be applied for large supports and for the interior surfaces of tubular supports. Seeding by colloidal particles seems a more general method. Colloidal zeolite seeds can be deposited on either planar or tubular supports using well-known colloidal particle deposition procedures such as dip-coating.

The dry gel conversion method is also called vapor phase transport. First a dry amorphous gel is formed on the support surface, followed by hydrothermal treatment in the presence of small amounts of water vapor or a mixture vapor consisting of a structure-directing agent and water. By this approach, a high concentration of nutrients is confined to the support surface, thus obviating the need for mass transport towards the support during hydrothermal growth. The thickness of the zeolite layer can be controlled by the thickness of the gel layer. This method has been shown to be successful for planar supports but is quite difficult for tubular supports.

4. Zeolite Membrane Modification

The sizes of the intracrystalline channel/pores and guest molecules are often one of the critical parameters in zeolite diffusion. Adjustment of the size and dimensionality of these channel systems is expected to be able to result in molecules being subjected to different diffusional resistance. Among the pore/channel-size controlling techniques, chemical vapor deposition (CVD) of silica on zeolite is an effective method to control the pore-opening size of zeolite and improve the shape-selective adsorption of mixtures of gases and liquids.

U.S. Pat. No. 6,051,517 discloses a modified zeolite or molecular sieve membrane for separation of materials on a molecular scale. The modified membrane is fabricated to wholly or partially block regions between zeolite crystals to inhibit transfer of larger molecules through the membrane, but without blocking or substantially inhibiting transfer of small molecules through pores in the crystalline structure. The modified membrane has a monomolecular layer deposited on the zeolite surface which has coordinated groups of atoms that include (i) a metal atom bonded to oxygen atoms that are bonded to the zeolite substrate atoms (e.g., silicon atoms) and (ii) either hydroxyl groups bonded to the metal atoms or additional oxygen atoms bonded to the metal atoms.

U.S. Published Patent Application No. 2011/0,247,492 discloses a modified FAU zeolite membrane produced by a seeding/secondary (hydrothermal) growth approach in which a structure directing agent such as tetramethylammonium hydroxide is included in the aqueous crystal-growing composition used for membrane formation.

BRIEF SUMMARY OF THE INVENTION

This invention provides a new method to fabricate a robust zeolite membrane having high selectivity and flux and excellent hydrothermal and chemical stability. The composite separation membrane prepared can be used more efficiently to separate components at high temperature from gas, vapor, or liquid mixtures generated by industrial processes. That composite separation membrane can be combined with chemical reactions in membrane reactor system.

According to a method of the invention for preparing a composite zeolite membrane, a porous substrate is coated to form one or more seed layers on the porous substrate, and then the seeded substrate is put in contact with a precursor comprising NaOH, $SiO_2$, and tetrapropyl ammonium hydroxide (TPAOH), and $H_2O$. The precursor and seeded substrate are heated under hydrothermal conditions to form a zeolite membrane having a framework; and then the zeolite membrane is subjected to metal doping.

The porous substrate can be selected from the group consisting of porous glass, porous carbon, porous ceramic, porous metal, and composites of two or more thereof. Also, the porous substrate can be in a typically useful shape, such as flat sheets, disks, tubes, or cylinders.

The porous substrate may be coated with a seed suspension.

The precursor may comprise $TiO_2$, $SiO_2$, and TPAOH in an approximate ratio of 1 $SiO_2$:y $TiO_2$:0.12 TPAOH:60 $H_2O$:4 EtOH, where y is in the range of from 0.01 to 0.04.

With regard to metal doping, a metal is doped on specific sites of the zeolite membrane framework. The zeolite membrane framework has channels of zeolite pores and the doping sites are in the channels. The metal doped on the zeolite membrane framework is a transition metal, preferably a transition metal is selected from the group consisting of transition metals of Groups 1B and 6B to 8B of the Periodic Table, more preferably a transition metal is selected from the group consisting of transition metals of Groups 1B and 8B of the Periodic Table. Most preferably the transition metal is palladium or lead in the form of an alloy.

The metal doping is carried out by one or more of the processes selected from the group consisting of melting salt vapor deposition, plasma treatment, and UV-irradiation.

According to the invention, a seeded layer on a porous substrate can be formed by adhering nanoparticle seeds comprising NaOH, $SiO_2$, tetrapropyl ammonium hydroxide (TPAOH), and $H_2O$ to the outer surface of a porous substrate having a receptive outer surface by hydrothermal synthesis to form a seeded substrate. The seeded substrate is then subjected to temperature programming calcination to remove a template. The porous substrate is selected from the group consisting of porous glass, porous carbon, porous ceramic, porous metal, and composites of two or more thereof.

The precursor for nanoparticle seeds comprises NaOH, $SiO_2$, and TPAOH in an approximate molar ratio of x $SiO_2$:1 TPAOH:55.6 $H_2O$, where x is in the range of from 2 to 6, preferably in an approximate molar ratio of 0.33 $SiO_2$:0.1 TPAOH:0.035 NaOH:5.56 $H_2O$.

A dip-coating technique can be used for adhering nanoparticle seeds to the porous substrate to make the seeded substrate. Optionally spray coating or sputtering may be employed.

Preferably the nanoparticle seeds are dispersed in a suspension with a final pH value of from 6-8. The coating may comprise a further step of coating the porous substrate with a zeolite nanoparticle suspension one or more times to form one or more seeded layers on the seeded substrate.

A metal doped zeolite membrane prepared by the method described above is particularly useful for separating hydrogen from syngas or another gas mixture containing $CO_2$, $N_2$, $CH_4$, CO, and $H_2O$, optionally at high temperature and/or where a gaseous mixture contains a small amount of one or more impurities, such as, $H_2S$ or $NH_3$.

One of the industrial applications of this invention can be found in water gas shift reaction for hydrogen production. Currently, hydrogen production from fossil fuels involves two major steps. The first step is the partial oxidation or stream reforming of the carbonaceous materials, or coal gasification to syngas, mainly consisting of hydrogen and carbon monoxide (CO). In the second step, the CO in the syngas is subsequently converted to $CO_2$ and $H_2$ generating more $H_2$ via water gas shift (WGS) reaction. During this second step of the process, the hydrogen would be separated from other compounds, and the concentrated $CO_2$ can be compressed and transported to the treatment site for sequestration. If the WGS reaction and membrane separation are combined into one step at high temperature (350-500° C.) and pressure, hydrogen will be removed from the membrane constantly. According to Le Chatelier's Principle, the equilibrium of WGS reaction would move to the right hand side, and, therefore, the conversion efficiency would be significantly enhanced.

In an aspect of the invention, a metal doped zeolite membrane is useful for gas separation, wherein the membrane comprises a porous substrate and a zeolite layer with metal doping.

In another aspect of the invention, a metal doped zeolite membrane is useful for hydrogen, oxygen, methane, or olefin separation.

In another aspect of the invention, a metal doped zeolite membrane is useful for hydrogen or olefin separation.

In another aspect of the invention, a metal doped zeolite membrane is useful for hydrogen separation from syngas or another gas mixture containing $CO_2$, $N_2$, $CH_4$, CO, and/or $H_2O$.

In another aspect of the invention, a metal doped zeolite membrane comprises a zeolite layer with MFI framework structure.

In another aspect of the invention, a metal doped zeolite membranes comprises heteroatoms incorporated into MFI silica framework.

In another aspect of the invention, the heteroatoms comprise titanium, vanadium, niobium, or a combination of two or more thereof.

In another aspect of the invention, the zeolite membrane framework has channels of zeolite pores and there are sites in the channels.

In another aspect of the invention, a doping metal is a transition metal or an alloy of transition metals.

In another aspect of the invention, a doping metal is a transition metal of Groups 1B and 6B to 8B of the Periodic Table, as alloy thereof, or a combination thereof.

In another aspect of the invention, a doping metal is a transition metal of Groups 1B and 8B of the Periodic Table, an alloy thereof, or a combination thereof.

In another aspect of the invention, a doping metal is palladium, silver, or copper or an alloy thereof.

In another aspect of the invention, a method for making a composite zeolite membrane comprises the steps of:
  providing a porous substrate;
  coating the porous substrate to form one or more seed layers;
  providing a precursor comprising (i) NaOH, (ii) $TiO_2$, $V_2O$, or $Nb_2O$, (iii) $SiO_2$, (iv) tetrapropyl ammonium hydroxide (TPAOH), (v) ethanol (EtOH), and (vi) $H_2O$;
  placing the precursor in contact with the seeded substrate;
  heating the precursor and seeded substrate under hydrothermal conditions to form a zeolite membrane having a framework; and
  subjecting the zeolite membrane to metal doping.

In another aspect of a method of the invention, the porous substrate is selected from the group consisting of porous glass, porous carbon, porous ceramic, porous metal, and composites of two or more thereof.

In another aspect of a method of the invention, the porous substrate is in the shape of one of flat sheets, disks, tubes and cylinders.

In another aspect of a method of the invention, the porous substrate is coated with a seed suspension.

In another aspect of a method of the invention, the precursor comprises $SiO_2$, X, TPAOH, $H_2O$, and EtOH in an approximate ratio of 1 $SiO_2$:y X:0.12 TPAOH:60 $H_2O$:4 EtOH where X can be $TiO_2$, $V_2O$, or $Nb_2O$ and y is in the range of from 0.01 to 0.04.

In another aspect of a method of the invention, a metal is doped on specific sites of the zeolite membrane framework.

In another aspect of a method of the invention, the zeolite membrane framework has channels of zeolite pores and the sites are in the channels.

In another aspect of a method of the invention, the metal doped on the zeolite membrane framework is a transition metal or an alloy of transition metals.

In another aspect of a method of the invention, a doping metal is a transition metal selected from the group consisting of transition metals of Groups 1B and 6B to 8B of the Periodic Table, alloys thereof, and combinations thereof.

In another aspect of a method of the invention, a doping metal is a transition metal selected from the group consisting of transition metals of Groups 1B and 8B of the Periodic Table, alloys thereof, and combinations thereof.

In another aspect of a method of the invention, the transition metal is palladium, silver, or copper or an alloy thereof.

In another aspect of a method of the invention, the metal doping is carried out by one or more of the processes selected from the group consisting of melting salt vapor deposition, plasma treatment, and UV-irradiation.

In another aspect of a method of the invention, the zeolite membrane framework comprises an MFI structure.

In another aspect of a method of the invention, forming a seeded layer on a porous substrate, comprises the steps of:
  providing a porous substrate having a receptive outer surface;
  providing nanoparticle seeds comprising NaOH, $SiO_2$, tetrapropyl ammonium hydroxide (TPAOH), and $H_2O$;
  adhering the nanoparticle seeds to the outer surface of the porous substrate by hydrothermal synthesis to form a seeded substrate; and
  subjecting the seeded substrate to temperature programming calcination to remove a template.

In another aspect of a method of the invention, the porous substrate is selected from the group consisting of porous glass, porous carbon, porous ceramic, porous metal, and composites of two or more thereof.

In another aspect of a method of the invention, the porous substrate is in the shape of one of flat sheets, disks, tubes, and cylinders.

In another aspect of a method of the invention, the precursor for nanoparticle seeds comprises NaOH, $SiO_2$, and TPAOH in an approximate molar ratio of x $SiO_2$:1 TPAOH: 55.6 $H_2O$, where x is in the range of 2 to 6.

In another aspect of a method of the invention, the precursor for nanoparticle seeds comprises NaOH, $SiO_2$, and TPAOH in an approximate molar ratio of 0.33 $SiO_2$:0.1 TPAOH:0.035 NaOH:5.56 $H_2O$.

In another aspect of a method of the invention, a dip-coating technique is used for adhering nanoparticle seeds to the porous substrate to make the seeded substrate.

In another aspect of a method of the invention, the nanoparticle seeds are dispersed in a suspension with a final pH value of from about 6 to 8.

In another aspect of a method of the invention, the method comprises the further step of coating the porous substrate with a zeolite nanoparticle suspension one or more times to form one or more seeded layers on the seeded substrate.

In another aspect of a method of the invention, the coating is carried out by one of dip coating, spray coating, and sputtering.

In another aspect of the invention, a metal doped zeolite membrane is prepared by the method described above.

In another aspect of the invention, a molecular sieve comprises a metal doped zeolite membrane prepared by the method described above.

Another aspect of the invention comprises an improved method of separating hydrogen from syngas or another gas mixture containing $CO_2$, $N_2$, $CH_4$, CO, and $H_2O$ using a molecular sieve described above as the catalyst.

In another aspect of a method of the invention, the improved method is carried out at high temperature.

In another aspect of a method of the invention, the gaseous mixture used in the improved procedure contains a small amount of one or more impurities.

In another aspect of a method of the invention, the impurity is $H_2S$ and/or $NH_3$.

BRIEF DESCRIPTION OF THE DRAWINGS

This invention may be more readily understood by reference to the following drawings wherein.

DETAILED DESCRIPTION OF THE INVENTION

Figure 1:
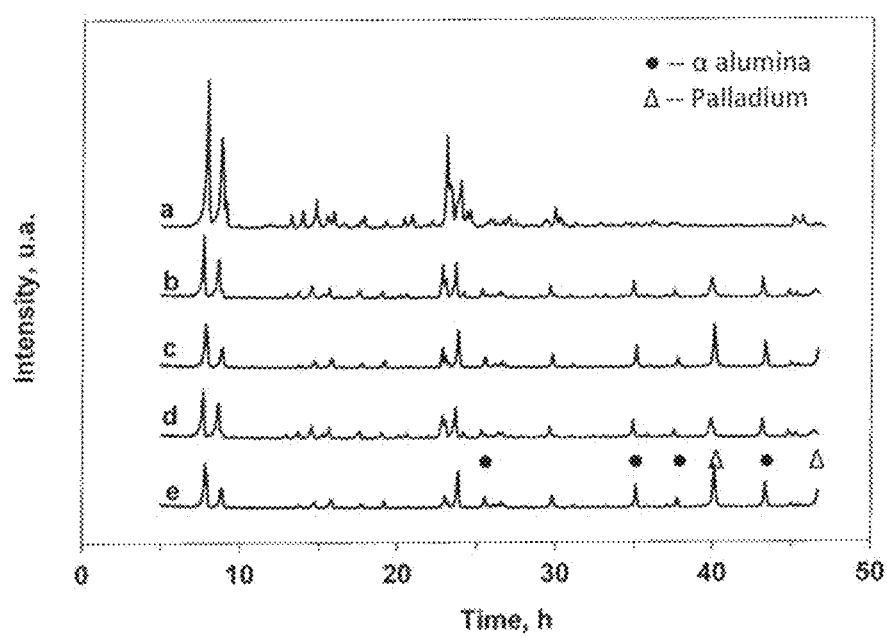
FIG. 1 represents XRD patterns of zeolite powder and composite zeolite membrane.
Figure 2A:
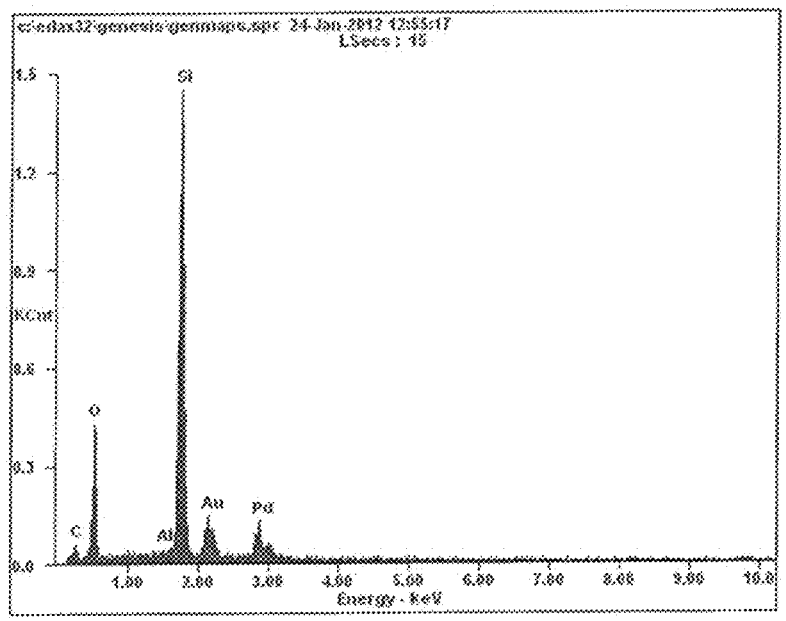
FIGS. 2A and 2B represent the energy dispersive X-ray spectrometry (EDS) results of Pd-doped zeolite membrane (sample M-1)
Figure 2B:
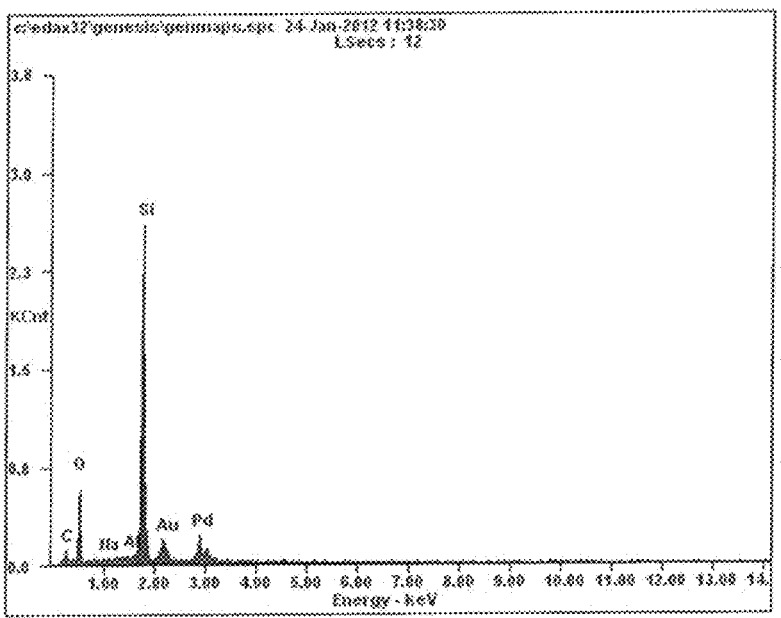
Figure 3A:
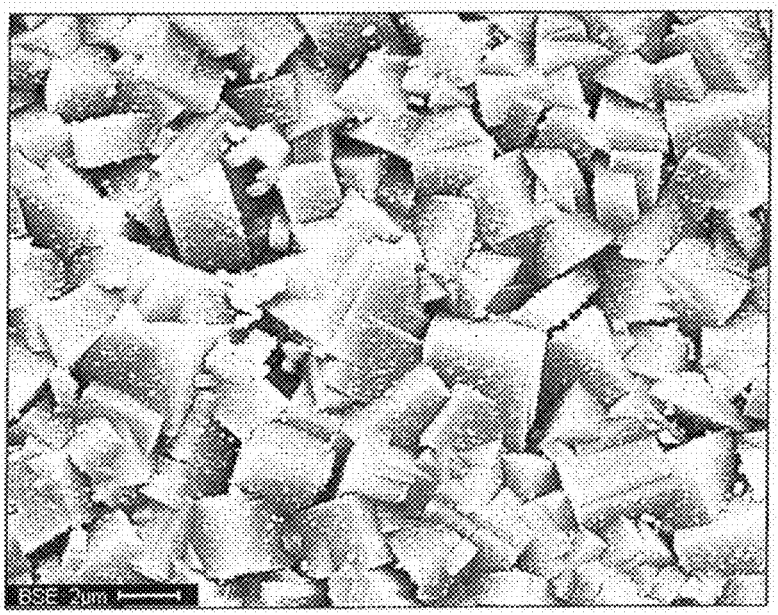
FIGS. 3A and 3B represent the scanning electron microscopy (SEM) images of Pd-doped zeolite membrane.
Figure 3B:
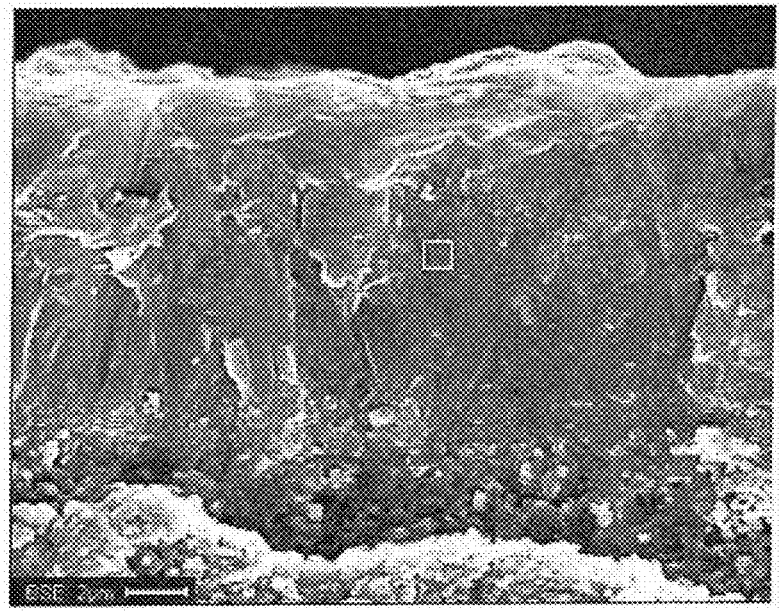

In accordance with this invention, a composite zeolite membrane is prepared by the following procedure, (1) MFI zeolite membrane is grown on a treated porous substrate (either uncoated or nano-scale zeolite seed coated); (2) a template removal step (if necessary); (3) metal doping process. It should be noted that each step above mentioned involves unique technique specially employed to obtain a composite membrane, in which specific molecules permeate through the membrane with high selectivity as well as high permeability.

With reference to the above-mentioned procedure, optional porous substrates include disk shape, tubular, or hollow fiber porous ceramic, porous silica, metal mesh, or sintered porous metallic support. Ceramic porous materials are preferred to be the substrates in this invention because of their good affinity to the zeolite materials. Optional seed materials include various zeolite nano-particles, zirconia, titania. Pure siliceous silicalite is preferred to be the seed because of its well-defined crystal structure, high temperature compatibility and excellent hydrothermal stability. Transition metals or metal alloys with absorption/adsorption property, hydrothermal stability, and structure integrity can be selected as doping materials to be dispersed in the zeolitic pores by means of ion-exchange, melt salt vaporization, plasma irradiation, or photo-assisted irradiation.

1. Supported MFI Zeolite Membranes

MFI type zeolite membranes in this invention are generally prepared in hydrothermal conditions by either in situ crystallization or secondary growth on pre-coated MFI zeolite seed layers.

In the in-situ crystallization method, a suitable support is placed in contact with a precursor solution or gel in an autoclave. A zeolite film is then grown on the support under hydrothermal conditions. After hydrothermal synthesis, the membrane grown on the substrate is further treated by rinsing, drying, and template removing under a certain temperature program.

In the secondary growth method, the silicalite nanoparticle seeds are prepared by means of hydrothermal synthesis. The nano-scale seed particles are coated on the porous substrate by dip-coating, spin coating, or powder coating method, followed by thermal treatment. The precursor solution for secondary growth is prepared in a Teflon beaker. The seeded substrate is placed at the bottom of the vessel and completely immersed in the synthesis solution.

The following examples are presented in order to better describe this invention. These examples are used to illustrate the process for zeolite membrane preparation, and not necessarily represent the best formula. It is noted that, this invention is not limited by the following examples. The chemicals used in these demonstrating examples include: silica (fumed), tetraethyl orthosilicate (TEOS), titanium butoxide (TBOT), tetrapropyl ammonium hydroxide (20%) (TPAOH), iso-propanol (IPA), hydrogen peroxide ($H_2O_2$, 30%), ethanol (EtOH), and Glycerol.

EXAMPLES

Example A

Silicalite (MFI structure) zeolite membrane preparation by in-situ method:

A precursor was prepared by mixing 0.35 g NaOH, 5 g SiO2, and 25 ml TPAOH (1M) at 80° C. in a water bath to form a clear solution. The precursor was subjected to an aging process for four hours at room temperature. The precursor was then transferred to a 250 ml TEFLON® capped bottle, filtrating the solution with tissue (or Millipore, 0.8 μm). Hydrothermal synthesis can be carried out at a temperature of from about 160° to about 240° C., for a duration of from about 12 to about 48 hours. Here it was carried out in the container at a temperature of 200° C. for 24 hours. The synthesized membrane was rinsed with distilled water and then placed in an oven at 40° C. for two days.

A gas-tight test was performed to identify any defects in this membrane before a template removal process. The membrane before template removal was installed in the membrane cell. Head pressure of up to 40 psi was applied in the feeding gas (either nitrogen, or helium). No gas was detected over four hours in the permeate side, indicating that the prepared membrane was defect-free.

After the membrane was confirmed to be defect-free, the zeolite membrane was calcined to remove the template (excess material) occupying the inside of the zeolitic channels. The calcination was carried out following a specific temperature program, which comprised heating from room temperature to 450° C. with a heating rate of 0.3° C./min, holding at 450° C. for 8 hours, and then decreasing to room temperature at a cooling rate of 0.5° C./min.

The zeolite membrane (hereby named as "M-0") showed single gas permeance of small molecule gases ($H_2$, $CO_2$, $N_2$, $CH_4$) at different temperature, as shown in the following table:

TABLE 1

Single gas permeance and perselectivity (Membrane M-0).

| Temp, °C. | Single gas permeance, ×10⁻⁷ mol/·m²·s·Pa | | | | Permselectivity, | | |
|---|---|---|---|---|---|---|---|
| | $H_2$ | $CO_2$ | $N_2$ | $CH_4$ | $H_2/CO_2$ | $H_2/N_2$ | $H_2/CH_4$ |
| 25 | 3.45 | 4.33 | 1.04 | 1.41 | 0.80 | 3.32 | 1.73 |
| 250 | 4.07 | 1.85 | 1.22 | 1.45 | 2.20 | 3.34 | 2.81 |
| 450 | 4.76 | 1.07 | 1.48 | 1.72 | 4.45 | 3.22 | 2.76 |

Example B

This example demonstrated a TS-1 (MFI structure) zeolite membrane preparation by secondary growth method. Secondary growth method includes silicalite nanoparticle preparation, substrate dip-coating, and hydrothermal synthesis of the zeolite membrane.

The silicalite nanoparticle seeds, which were prepared by hydrothermal synthesis of a solution, had a molar ratio of $0.33(SiO_2):0.1(TPAOH):0.035(NaOH):5.56(H_2O)$. This precursor solution was obtained by dissolving 3.3 g fumed silica and 0.35 g NaOH pellets in 20 ml 1M TPAOH solution at 80° C. The precursor was aged at room temperature for four hours before receiving hydrothermal treatment. The hydrothermal synthesis temperature can be from about 60° C. to about 120° C., for a duration of from about 2 days to about 15 days. In this example, hydrothermal synthesis was carried out as the precursor was heated at a temperature of 65° C. for 12 days. The particle size of the resultant silicalite nanoparticles was about 60-80 nm, as measured by a particle size analyzer (Model 90 Plus, Brookhaven) and confirmed by SEM observations (Model XL 30, Philips).

After hydrothermal synthesis, the resultant silicalite nanoparticle slurry (10 ml) was diluted with 40 ml distilled water and peptized by 3 drops 1M $HNO_3$ solution. Hydroxyl propyl cellulose (HPC) (Mw=100,000, Aldrich) (0.1 wt % of HPC) was used as binder. The final stable colloidal silicalite suspension had a pH of 4~6 and contained 0.75 wt % of silicalite dry particles.

The silicalite nanoparticle seed layer was coated onto the polished side of the porous substrate prepared from A 16-SG alumina (Almatis ACC Ltd.) by dip-coating in a bench-top clean room. The contact time of the dip-coating process was: from 1-10 seconds, with a preferred contact time of 3-5 seconds, as here. After dip-coating, the substrate was dried at 40° C. for 24 hours in an oven with a controlled relative humidity of 60%. The seed layer coated substrate was then calcined in air at 450° C. for eight hours with a heating rate of 0.5° C./min, and a cooling rate of −0.5° C./min. The dip-coating process was repeated once to eliminate any possible defects that existed in the seed layer after the first coating.

The precursor for membrane synthesis was prepared according to the following mole ratio: 1 $SiO_2$:0.01 $TiO_2$:0.14 TPAOH:46 $H_2O$.

In a 250 ml TEFLON capped bottle, 20.83 g TEOS was added into TPAOH solution (14 ml 20% TPAOH and 65 ml $H_2O$, well mixed) dropwise, with stirring at room temperature four hours for hydrolysis. In another 250 ml TEFLON capped bottle, 0.34 g TBOT was added into 6.5 ml IPA under nitrogen environment. The solutions in the above containers were mixed under nitrogen environment. The well-mixed precursor was then moved into an autoclave (Model 4722, Parr Instruments) sealed with TEFLON liner. The autoclave was placed in an oven with the temperature set at 180° C. The precursor was subjected to hydrothermal synthesis at 180° C. for 48 hours.

After hydrothermal synthesis, the product was rinsed with distilled water, separated by centrifuge, and dried at 80° C. for 12 hours.

A gas-tight test was performed to identify any defects in this membrane before a template removal process.

After confirming that it was defect-free, the membrane was calcined to remove the template occupying inside zeolitic channels. The calcination was carried out following a temperature program which comprised heating from room temperature to 450° C. at a heating rate of 0.5° C./min, holding at 450° C. for eight hours, and cooling to room temperature at a cooling rate of −0.5° C./min.

Example C

This example demonstrates an TS-1 (MFI structure) zeolite membrane prepared from a different precursor by secondary growth method. Secondary growth method includes silicalite nanoparticle preparation, substrate dip-coating, and hydrothermal synthesis of the membrane.

The silicalite nanoparticle seeds, which were prepared by hydrothermal synthesis of a solution, had a molar ratio of $0.33(SiO_2):0.1(TPAOH):0.035(NaOH):5.56(H_2O)$. This precursor solution was obtained by dissolving 3.3 g fumed silica and 0.35 g NaOH pellets in 20 ml 1M TPAOH solution at 80° C. The precursor was aged at room temperature for four hours before receiving hydrothermal treatment. The hydrothermal synthesis temperature can be from about 60° C. to about 120° C., for a duration of from about 2 days to about 15 days. In this example, hydrothermal synthesis was carried out as the precursor was heated at a temperature of 75° C. for six days. The particle size of the resultant silicalite nanoparticles was about 80-100 nm, as measured by a particle size analyzer and confirmed by SEM observations.

After hydrothermal synthesis, the resultant silicalite nanoparticle slurry (10 ml) was diluted with 40 ml distilled water and peptized by 3 drops 1M $HNO_3$ solution. Hydroxyl propyl cellulose (HPC) (Mw=100,000, Aldrich) (0.1 wt % of HPC) was used as binder. The final stable colloidal silicalite suspension had a pH of 4~6 and contained 0.75 wt % of silicalite dry particles.

The silicalite nanoparticle seed layer was coated onto the polished side of the porous substrate prepared from A 16-SG alumina (Almatis ACC Ltd.) by dip-coating in a bench-top clean room. The contact time of the dip-coating process was from 1-10 seconds, with a preferred contact time of 3-5 seconds. After dip-coating, the substrate was dried at 40° C. for 24 hours in an oven with a controlled relative humidity of 60%. The seed layer coated substrate was then calcined in air at 450° C. for eight hours with a heating rate of 0.5° C./min, and a cooling rate of −0.5° C./min. The dip-coating process was repeated once to eliminate any possible defects that existed in the seed layer after the first coating.

The precursor for membrane synthesis was prepared according to the following mole ratio: 1 $SiO_2$:0.02 $TiO_2$:0.17 TPAOH:120 $H_2O$.

In a 250 ml TEFLON capped bottle, 20.83 g TEOS was added into TPAOH solution (17 ml 20% TPAOH and 90 ml $H_2O$, well mixed) dropwise, with stirring at room temperature four hours for hydrolysis. In another 250 ml TEFLON capped bottle, 0.68 g TBOT was added into $H_2O_2$ solution (10 ml 30% $H_2O_2$ and 90 ml $H_2O$, well mixed) under nitrogen environment. The solutions in the above containers were mixed under nitrogen environment. The well-mixed precursor was then moved into an autoclave sealed with TEFLON liner. The autoclave was placed in an oven with the temperature set at 180° C. The precursor was subjected to hydrothermal synthesis at 180° C. for 48 hours.

After hydrothermal synthesis, the product was rinsed with distilled water, separated by centrifuge, and dried at 80° C. for 12 hours.

A gas-tight test was performed to identify any defects in this membrane before a template removal process.

After confirming that it was defect-free, the membrane was calcined to remove the template occupying inside zeolitic channels. The calcination was carried out following a temperature program which comprised heating from room temperature to 450° C. at a heating rate of 0.5° C./min, holding at 450° C. for eight hours, and cooling to room temperature at a cooling rate of −0.5° C/min.

Example D

This example demonstrates a TS-1 (MFI structure) zeolite membrane prepared from a different precursor by secondary growth method. Secondary growth method includes silicalite nanoparticle preparation, substrate dip-coating, and hydrothermal synthesis of the membrane.

The silicalite nanoparticle seeds, which were prepared by hydrothermal synthesis of a solution, had a molar ratio of $0.33(SiO_2):0.1$ $(TPAOH):0.035(NaOH):5.56(H_2O)$. This precursor solution was obtained by dissolving 3.3 g fumed silica and 0.35 g NaOH pellets in 20 ml 1M TPAOH solution at 80° C. The precursor was aged at room temperature for four hours before receiving hydrothermal treatment. The hydrothermal synthesis temperature can be from about 60° C. to about 120° C., for a duration of from about 2 days to about 15 days. In this example, hydrothermal synthesis was carried out as the precursor was heated at a temperature of 65° C. for a duration of 12 days. The particle size of the resultant silicalite nanoparticles was around 60-80 nm, as measured by a particle size analyzer and confirmed by SEM observations.

After hydrothermal synthesis, the resultant silicalite nanoparticle slurry (10 ml) was diluted with 40 ml distilled water and peptized by 3 drops 1M $HNO_3$ solution. Hydroxyl propyl cellulose (HPC) (Mw=100,000, Aldrich) (0.1 wt % of HPC) was used as binder. The final stable colloidal silicalite suspension had a pH of 4~6 and contained 0.75 wt % of silicalite dry particles.

The silicalite nanoparticle seed layer was coated onto the polished side of the porous substrate prepared from A 16-SG alumina (Almatis ACC Ltd.) by dip-coating in a bench-top clean room. The contact time of the dip-coating process was from 1-10 seconds, with a preferred contact time of 3-5 seconds. After dip-coating, the substrate was dried at 40° C. for 24 hours in an oven with a controlled relative humidity of 60%. The seed layer coated substrate was then calcined in air at 450° C. for eight hours with a heating rate of 0.5° C./min, and a cooling rate of −0.5° C./min. The dip-coating process was repeated once to eliminate any possible defects that existed in the seed layer after the first coating.

The precursor for membrane synthesis is prepared according to the following molar ratio: 1 $SiO_2$:y $TiO_2$:0.12 TPAOH: 60 $H_2O$:4 EtOH, where y=0.01-0.04.

In a 250 ml TEFLON capped bottle, 20.83 g TEOS was added into TPAOH solution (12 ml 20% TPAOH and 96 ml $H_2O$, well mixed) dropwise, with stirring at room temperature four hours for hydrolysis. In another 250 ml TEFLON capped bottle, 0.34-1.36 g TBOT was added into 20 ml EtOH under nitrogen environment. The solutions in the above containers were mixed under nitrogen environment. The well-mixed precursor was then moved into an autoclave sealed with TEFLON liner. The autoclave was placed in an oven with the temperature set at 180° C. The precursor was subjected to hydrothermal synthesis at 180° C. for 48 hours.

After hydrothermal synthesis, the product is rinsed with distilled water, separated by centrifuge, and dried at 80° C. overnight.

A gas-tight test was performed to identify any defects in this membrane before a template removal process.

After confirming that it is defect-free, the membrane was calcined to remove the template occupying inside zeolite channels. The calcination was carried out following a temperature program which comprised heating from room temperature to 450° C. at a heating rate of 0.5° C./min, holding at 450° C. for eight hours, and cooling to room temperature at a cooling rate of −0.5° C./min.

Example E

This example demonstrates a TS-1 (MFI structure) zeolite membrane prepared from a different silicon source by secondary growth method. Secondary growth method includes silicalite nanoparticle preparation, substrate dip-coating, and hydrothermal synthesis of the membrane.

The silicalite nanoparticle seeds, which were prepared by hydrothermal synthesis of a solution, had a molar ratio of $0.33(SiO_2):0.1(TPAOH):0.035(NaOH):5.56(H_2O)$. This precursor solution was obtained by dissolving 3.3 g fumed silica and 0.35 g NaOH pellets in 20 ml 1M TPAOH solution at 80° C. The precursor was aged at room temperature for four hours before receiving hydrothermal treatment. The hydrothermal synthesis temperature can be from about 60° C. to about 120° C., for a duration of from about 2 days to about 15 days. In this example, hydrothermal synthesis was carried out as the precursor was heated at a temperature of 65° C. for a duration of 12 days. The particle size of the resultant silicalite nanoparticles was around 60-80 nm, as measured by a particle size analyzer and confirmed by SEM observations.

After hydrothermal synthesis, the resultant silicalite nanoparticle slurry (10 ml) was diluted with 40 ml distilled water and peptized by 3 drops 1M $HNO_3$ solution. Hydroxyl propyl cellulose (HPC) (Mw=100,000, Aldrich) (0.1 wt % of HPC) was used as binder. The final stable colloidal silicalite suspension had a pH of 4~6 and contained 0.75 wt % of silicalite dry particles.

The silicalite nanoparticle seed layer was coated onto the polished side of the porous substrate prepared from A 16-SG alumina (Almatis ACC Ltd.) by dip-coating in a bench-top clean room. The contact time of the dip-coating process was from 1-10 seconds, with a preferred contact time of 3-5 seconds. After dip-coating, the substrate was dried at 40° C. for 24 hours in an oven with a controlled relative humidity of 60%. The seed layer coated substrate was then calcined in air at 450° C. for eight hours with a heating rate of 0.5° C./min, and a cooling rate of −0.5° C./min. The dip-coating process was repeated once to eliminate any possible defects that existed in the seed layer after the first coating.

The precursor for membrane synthesis is prepared according to the following molar ratio: 1 $SiO_2$:y $TiO_2$:0.12 TPAOH: 60 $H_2O$:4 EtOH, where y=0.01-0.04.

In a 250 ml TEFLON capped bottle, 0.35 g NaOH, 6.03 g SiO2, 25 ml TPAOH (1M), and 25 g $H_2O$ were mixed by vigorous stirring at 80° C. in a water bath to form a clear solution. The solution was then subjected to aging for four hours. In another 250 ml TEFLON capped bottle, 0.34-1.36 g TBOT was added into 20 ml EtOH under nitrogen environment. The solutions in the above containers were mixed under nitrogen environment. The well mixed precursor is then move into an autoclave sealed with TEFLON liner. The autoclave was placed in an oven with the temperature set at 180° C. The precursor was subject to hydrothermal synthesis at 180° C. for 48 hrs. After hydrothermal synthesis, the product was rinsed with distilled water, separated by centrifuge, and dried at 80° C. overnight.

A gas-tight test was performed to identify any defects in this membrane before a template removal process.

After confirming that it is defect-free, the membrane was calcined to remove the template occupying inside zeolitic channels. The calcination was carried out following a temperature program which comprised heating from room temperature to 450° C. at a heating rate of 0.5° C./min, holding at 450° C. for eight hours, and cooling to room temperature at a cooling rate of −0.5° C./min.

2. Metal Cluster Deposition on Zeolitic Pores

Zeolites can serve as hosts for small metal clusters, metal oxides or sulfides. A metal containing modified agent can passivate the external surface and control the opening size of the zeolite. The pore structure of zeolites may thus be modified by introducing new species through various techniques, such as ion exchange, impregnation, or chemical vapor deposition. Ion exchange is a reversible chemical reaction, in which ions may be exchanged between two interacting phase. Ion exchange shows high and even dispersion. However, in case of titanium silicalite material the impregnation is the more appropriate, since titanium silicalite has low ion exchange capacity. By carefully controlling the metal clusters can be dispersed in zeolitic pores, even though the method may yield relative larger metal particles on the zeolite external surface.

This invention presents a technique (photo-assisted deposition) other than ion exchange or impregnation for metal doping of the zeolite membranes. The unique photo catalytic properties of the selected MFI zeolite material make it possible to deposit metal clusters on specific sites of the zeolitic framework. An ultraviolet light source is used to facilitate the anchorage of metal cluster in zeolite framework.

The unique photo catalytic property of zeolites involving transition metals (i.e., titanium) within the zeolite cavities and framework makes it possible to deposit metal clusters on specific sites of the zeolitic framework. Titanium silicalite zeolite has the isolated tetrahedrally-coordinated titanium oxide moieties included within the frameworks. These tetrahedrally-coordinated titanium oxide moieties can perform single-site photo-catalytic activity so that sub-nano metal clusters can be precisely controlled and deposited in Ti-containing silicalite unit cells. XRD characterization for five samples, including titanium silicalite powder from the same batch of the zeolite membrane, the metal deposited membranes from different synthesis formula.

As can be seen from FIG. 1, the XRD profile of zeolite powder shows a typical MFI structure: (a) zeolite powder (same batch in formula B membrane); (b) M-1; 1200 W UV composite zeolite membrane, formula B; (c) M-2: 12 W UV composite zeolite membrane, formula B; (d) M-3: 1200 W UV composite zeolite membrane, formula C; (e) M-4; 12 W UV composite zeolite membrane, formula C. lite powder shows a typical MFI structure. Both formula B and C can derive titanium silicalite zeolite crystals, which are supposed to grow on the seeded substrate in a polycrystalline structure. Metal crystals (palladium in this case) are also observed from XRD patterns on four Pd-doped zeolite membranes, indicating that part of palladium exists in the form of aggregated crystals. However, samples irradiated with high power UV (1200 W) show less intensity, representing that higher dispersion of Pd, as well as a trend of Pd doping in zeolitic pores.

Pd doping of the membranes prepared according to the Examples B, C, D, and E is carried out by UV irradiation. The samples are named M-1, M-2, M-3, M-4, respectively. FIGS. 2A to 3B show the EDS or SEM results of Pd-doped zeolite membrane (sample M-1). The tiny dust-like particles covered on the membrane surface are likely the reflection of un-rinsed amorphous silica because any Pd salts are supposed to be reduced to metal palladium and cannot be observed by SEM due to its high electric conductivity. The EDS results from the spots of membrane surface and inside of the bulk show clearly different elemental distribution, as summarized in Table 2 below. The membrane itself is almost purely silicious with negligible amount of aluminum.

TABLE 2

EDS results of palladium doped TS-1 zeolite membrane

| EDS of membrane surface | | | EDS of membrane inside | | |
|---|---|---|---|---|---|
| Element | Wt % | Atom % | Element | Wt % | Atom % |
| OK | 23.28 | 34.82 | OK | 20.95 | 31.34 |
| NaK | 00.08 | 00.09 | NaK | 00.13 | 00.14 |
| AlK | 00.05 | 00.04 | AlK | 00.14 | 00.15 |
| SiK | 40.24 | 34.29 | SiK | 35.15 | 29.95 |
| AuM | 11.30 | 01.37 | AuM | 01.78 | 00.22 |
| PdL | 02.31 | 00.52 | PdL | 06.15 | 01.38 |
| Matrix | Correction | ZAF | Matrix | Correction | ZAF |

The appearance of gold (Au) is because of the sample coating for SEM operation. The Au percentage (1.37 at %) in membrane surface is significantly higher than that inside of bulky membrane (0.22 at %), representing that sputter coating does not cause penetration of Au into the membrane bulk. On the contrary, the Pd percentage (0.52 at %) in membrane surface is lower than that inside of bulky membrane (1.38 at %), indicating that Pd solution treatment followed by UV irradiation makes the Pd doping mainly occurs in the bulky zeolite membrane rather than on the membrane surface.

Figure 4A:
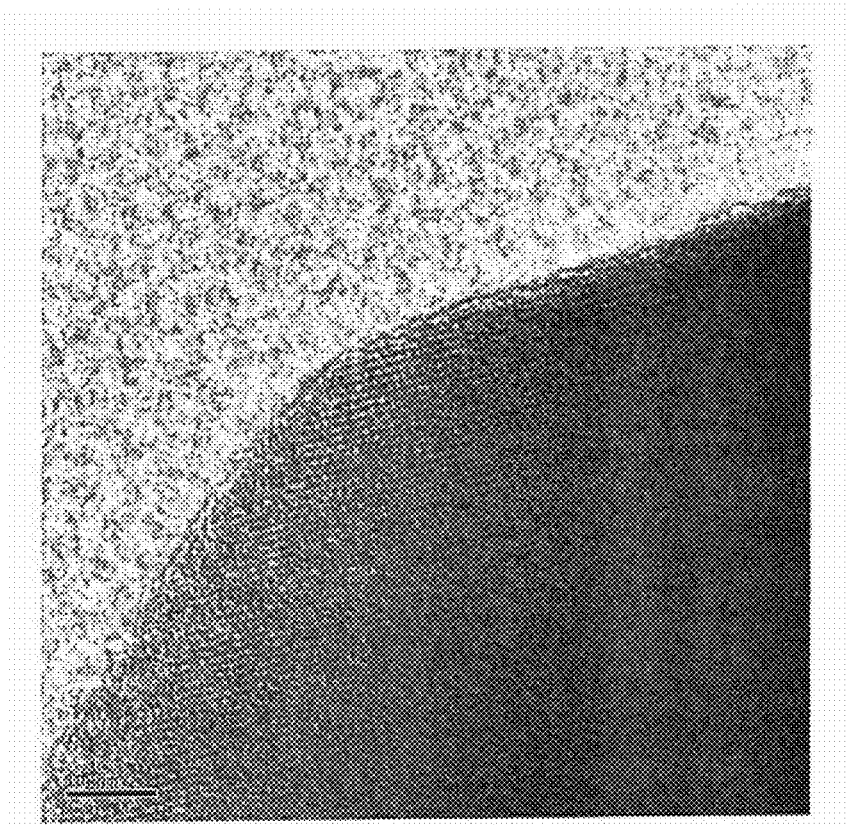
FIGS. 4A and 4B show the TEM/EDX results of metal-doping zeolite (obtained from Example B).
Figure 4B:
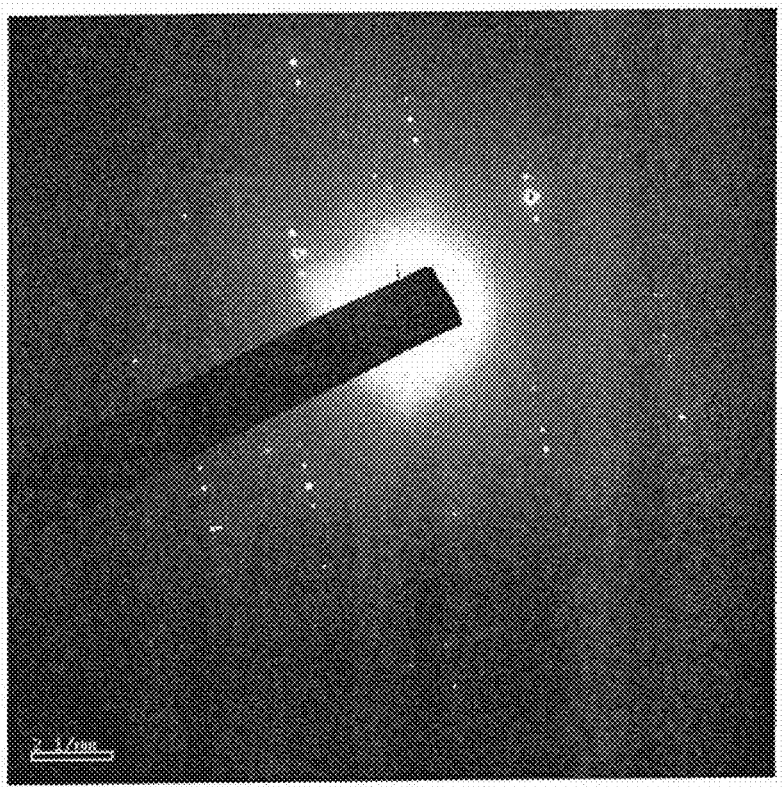

FIG. 4A shows the TEM result of titanium silicalite zeolite sample (powder sample from the same batch of membrane sample M-1). The uniform crystalline structure is clearly shown in the image FIG. 4B. The dimension of the zeolitic pores is between 0.5-0.6 nm, well in agreement with the typical data from the literature. The electric diffraction (EDX) of this zeolite sample further confirmed the crystalline structure.

3. Membrane Performance

Membrane (M-1) is evaluated first by single gas permeation test. Single gas ($H_2$, $CO_2$, $N_2$, and $CH_4$) permeance of the membrane is measured by transient method within the temperature range from 25-450° C. The results are shown in the following table:

TABLE 3

Single gas permeance and perselectivity (membrane M-1).

| Temp, | Single gas permeance, ×10$^{-7}$ mol/·m$^2$·s·Pa | | | | Permselectivity, | | |
|---|---|---|---|---|---|---|---|
| ° C. | $H_2$ | $CO_2$ | $N_2$ | $CH_4$ | $H_2/CO_2$ | $H_2/N_2$ | $H_2/CH_4$ |
| 25 | 0.239 | 0.348 | 0.036 | 0.025 | 0.68 | 6.7 | 9.4 |

TABLE 3-continued

Single gas permeance and perselectivity (membrane M-1).

| Temp, | Single gas permeance, ×10$^{-7}$ mol/m$^2$·s·Pa | | | | Permselectivity, | | |
|---|---|---|---|---|---|---|---|
| °C. | H$_2$ | CO$_2$ | N$_2$ | CH$_4$ | H$_2$/CO$_2$ | H$_2$/N$_2$ | H$_2$/CH$_4$ |
| 200 | 0.977 | 0.101 | 0.050 | 0.048 | 9.7 | 19.7 | 20.2 |
| 300 | 2.70 | 0.0588 | 0.062 | 0.055 | 45.9 | 43.4 | 48.7 |
| 375 | 3.23 | 0.0555 | 0.070 | 0.061 | 58.2 | 46.2 | 52.6 |
| 450 | 3.82 | 0.0605 | 0.078 | 0.064 | 63.2 | 48.9 | 59.7 |

The membrane (M-1) has H$_2$/CO$_2$ perm-selectivity of <1 at room temperature because the H$_2$ permeation is limited by the preferentially adsorbed CO$_2$ in the zeolite pores. At higher temperature above 200° C., the permeance for all gases increases with, increasing temperature, indicating a predominant activated diffusion mechanism even for these relatively larger molecules.

The membrane (M-3) shows single gas permeance of small molecule gases (H$_2$, CO$_2$, N$_2$, CH$_4$ at different temperature showing in the following table:

TABLE 4

Single gas permeance and perselectivity (membrane M-3).

| Temp, | Single gas permeance, ×10$^{-7}$ mol·m$^2$·s·Pa | | | | Permselectivity, | | |
|---|---|---|---|---|---|---|---|
| °C. | H$_2$ | CO$_2$ | N$_2$ | CH$_4$ | H$_2$/CO$_2$ | H$_2$/N$_2$ | H$_2$/CH$_4$ |
| 25 | 0.308 | 0.369 | 0.027 | 0.030 | 0.83 | 18.8 | 16.9 |
| 200 | 1.09 | 0.144 | 0.042 | 0.035 | 7.6 | 25.9 | 31.1 |
| 300 | 2.18 | 0.0513 | 0.056 | 0.036 | 42.5 | 38.9 | 60.6 |
| 375 | 3.09 | 0.0524 | 0.060 | 0.038 | 59.0 | 51.5 | 81.3 |
| 450 | 3.96 | 0.0539 | 0.062 | 0.040 | 73.5 | 63.9 | 99.0 |

This membrane (M-3) has H$_2$/CO$_2$, H$_2$/N$_2$ and H$_2$/CH$_4$ perm-selectivity values much greater than Knudsen factors at room temperature. The very good size selectivity &r small molecule gases (i.e., H$_2$ over CO$_2$, N$_2$, and CH$_4$), which is determined by molecular diffusivity in the zeolite channels, suggests that the membrane has negligible inter-crystal line pores.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

We claim:

1. A metal doped zeolite membrane for gas separation, wherein the membrane comprises a porous substrate and a zeolite layer thereon having pores with metal clusters in the zeolite pores.

2. The metal doped zeolite membrane of claim 1, wherein the zeolite layer comprises an MFI structure framework.

3. The metal doped zeolite membrane of claim 2, wherein heteroatoms are incorporated into the MFI structure framework.

4. The metal doped zeolite membrane of claim 3, wherein the heteroatoms comprise titanium, vanadium, niobium, or a combination of two or more thereof.

5. The metal doped zeolite membrane of claim 2, wherein the MFI structure has channels of zeolite pores and wherein the metal clusters are located in sites in the channels.

6. The metal doped zeolite membrane of claim 1, wherein the metal clusters comprise a transition metal or an alloy of transition metals.

7. The metal doped zeolite membrane of claim 6, wherein the metal clusters comprise a transition metal of Groups 1B and 6B to 8B of the Periodic Table, an alloy thereof, or a combination thereof.

8. The metal doped zeolite membrane of claim 7, wherein the metal clusters comprise a transition metal of Groups 1B and 8B of the Periodic Table, an alloy thereof, or a combination thereof.

9. The metal doped zeolite membrane of claim 8, wherein the metal clusters comprise palladium, silver, or copper or an alloy thereof.

10. A method for making a composite zeolite membrane, comprising the steps of:
    providing a nano-particle suspension;
    coating nano-particle seeds on a porous substrate to form one or more seed layers;
    providing a precursor comprising (i) NaOH, (ii) TiO$_2$, V$_2$O, or Nb$_2$O, (iii) SiO$_2$, (iv) tetrapropyl ammonium hydroxide (TPAOH), (v) ethanol (EtOH), and (vi) H$_2$O;
    placing the precursor in contact with the seeded porous substrate;
    heating the precursor and seeded substrate under hydrothermal conditions to form a zeolite membrane having a porous framework; and
    subjecting the zeolite membrane to metal doping to form metal clusters in pores of the framework.

11. The method. of claim 10, wherein the porous substrate is coated with a temperature-programmed synthesized nano-particie seed suspension.

12. The method of claim 10, wherein the precursor comprises SiO$_2$, X, TPAOH, H$_2$O, and EtOH in an approximate ratio of 1 SiO$_2$:y X: 0.12 TPAOH:60 H$_2$O:4 EtOH, where X can be TiO$_2$, V$_2$O, or Nb$_2$O and y is in the range of from 0.01 to 0.04.

13. The method of claim 10, wherein a metal is doped on specific sites of the zeolite membrane framework.

14. The method of claim 13, wherein the zeolite membrane framework has channels of zeolite pores and the sites are in the channels.

15. The method of claim 10, wherein the metal doping on zeolite membranes is carried out by one or more of the processes selected from the group consisting of melting salt vapor deposition, plasma treatment, and UV-irradiation.

16. The method of claim 10, wherein the zeolite membrane framework comprises an MR structure.

17. A metal doped zeolite membrane prepared by the method of claim 10.

18. A molecular sieve comprising the metal doped zeolite membrane of claim 17.

19. In an improved method of separating hydrogen from syngas or another gas mixture containing CO$_2$, N$_2$, CH$_4$, CO, H$_2$O, and a small amount of impurities, the improvement wherein the molecular sieve of claim 18 is used as part of the reactor system.

20. The method of claim 19 which is carried out at high temperature.

21. The method of claim 19, wherein the gaseous mixture contains a small amount of one or more impurities.

22. The method of claim 21, wherein the impurity is H$_2$S and/or NH$_3$.

23. The metal doped zeolite membrane of claim 17, wherein the doping metal is a transition metal or an alloy of transition metals.

24. The metal doped zeolite membrane of claim 23, wherein the doping metal is a transition metal of Groups 1B and 6B to 8B of the Periodic Table, an alloy thereof, or a combination thereof.

25. The metal doped zeolite membrane of claim 24, wherein the doping metal is a transition metal of Groups 1B and 8B of the Periodic Table, an alloy thereof, or a combination thereof.

26. The metal doped membrane of claim 25, wherein the doping metal is palladium, silver, or copper or an alloy thereof.

\* \* \* \* \*